Aug. 8, 1967

C. KAY ET AL 3,334,789

TIME CONTROLLED LIQUID DISPENSER FOR WATER
CONDITIONING SYSTEMS WITH WICK FEED

Filed June 1, 1966

INVENTORS
CLIFFORD KAY
CHARLES E. NYGREN

Joseph G. Werner

ATTORNEY

INVENTORS
CLIFFORD KAY
CHARLES E. NYGREN

*Joseph G. Werner*

ATTORNEY

United States Patent Office 3,334,789
Patented Aug. 8, 1967

3,334,789
TIME CONTROLLED LIQUID DISPENSER FOR WATER CONDITIONING SYSTEMS WITH WICK FEED
Clifford Kay and Charles E. Nygren, Madison, Wis., assignors to Clack Corporation, Madison, Wis., a corporation of Wisconsin
Filed June 1, 1966, Ser. No. 554,471
4 Claims. (Cl. 222—70)

ABSTRACT OF THE DISCLOSURE

Apparatus for wick-feeding a controlled amount of concentrated liquid cleaner and sanitizer into a brine tank of a water softening system for introduction into the mineral tank with the brine to clean, sanitize and regenerate the resin bed in the mineral tank. One form has a liquid container, a generally U-shaped tube extending from the container to a brine tank, and a wick in the tube for feeding the liquid drop by drop to the brine tank. A second form has a solenoid valve at the end of the tube above the brine tank for dumping a measured volume of the liquid into the brine tank just prior to or during the regeneration cycle.

---

This invention relates generally to water conditioning systems and more particularly to a controlled-feed liquid dispenser for water softening systems and the like.

Conventional water softeners generally have four operating cycles, the frequency and duration of which may be controlled by an automatic timer. During the first operating cycle, commonly known as "service," raw water is softened for use by passing the raw water through a zeolite resin bed in the mineral tank of the water softener. Periodically the zeolite resin bed must be "backwashed" by washing water upwardly through the bed to rid it of dirt and impurities which have been deposited therein during the service cycle of operation. The zeolite resin bed in the mineral tank must also be "regenerated" periodically by passing a salt solution from the brine tank of the water softener through the zeolite resin bed in the mineral tank. After the zeolite resin bed has been "regenerated" it is rinsed with water in order to remove the salt solution or brine from the mineral tank.

An object of our invention is to provide a liquid dispenser for feeding a controlled amount of concentrated liquid cleaner, sanitizer or the like into the mineral tank of a water softening system for cleaning the zeolite resin bed and otherwise sanitizing the water softening system.

Another object of our invention is to provide a liquid dispenser for feeding a controlled amount of liquid cleaner, sanitizer or the like into the brine tank of a water softening system for introduction into the mineral tank with the brine during the regeneration cycle of operation.

Another object of our invention is to provide an extremely simple and inexpensive liquid dispenser for continuously feeding substantially a desired amount of liquid into the brine tank of a water softening system for introduction into the mineral tank with the brine during the regeneration cycle of operation.

Another object of our invention is to provide a simple and inexpensive liquid dispenser for filling a reservoir with a predetermined amount of liquid and having a reservoir outlet valve adapted to be actuated by the time mechanism of the water conditioning system for emptying said predetermined amount of liquid from said reservoir into the brine tank of the water softening system for introduction into the mineral tank with the brine during the regeneration cycle of operation.

Still another object of our invention is to provide a controlled-feed liquid dispenser for a water conditioning system having means for preventing siphoning of liquid from the liquid container of the dispenser when the reservoir outlet valve is opened.

Further objects, features and advantages of our invention will be apparent from the following detailed description taken in conjunction with the accompanying drawings wherein several embodiments of our invention have been selected for exemplification.

Figure 1:
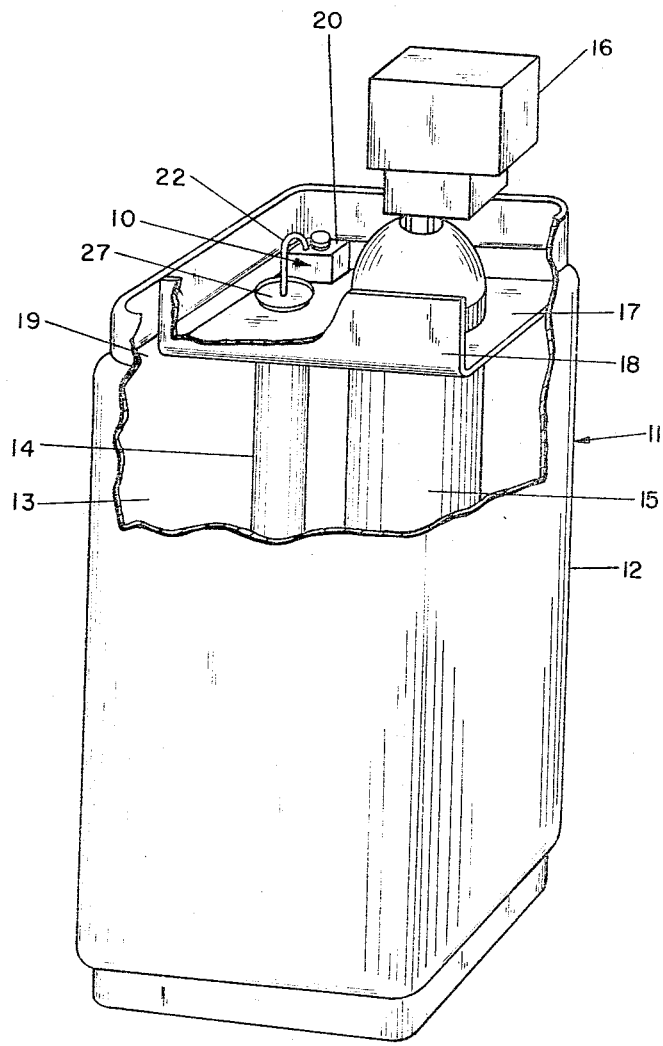
Figure 2:
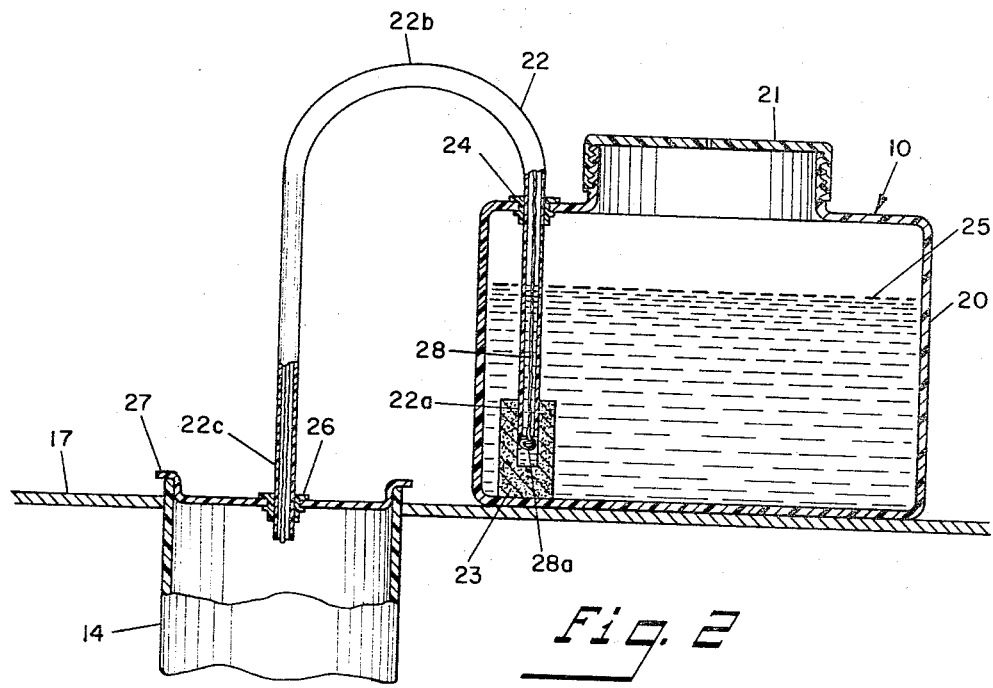
Figure 3:
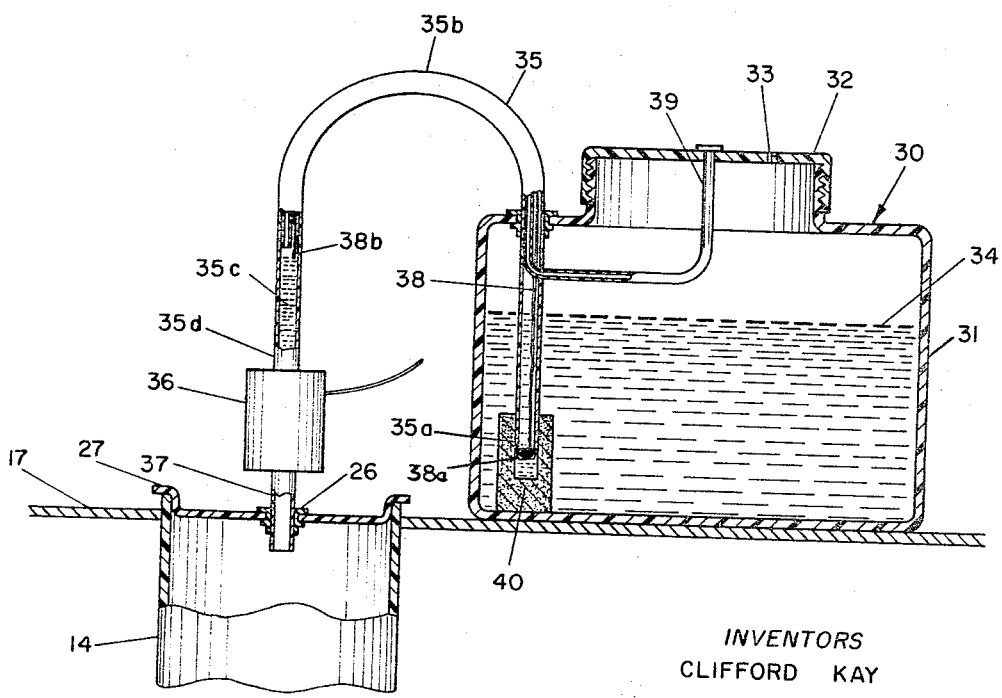

In the drawings:
FIG. 1 is a perspective view of a liquid dispenser in combination with a water conditioning system with portions thereof broken away.
FIG. 2 is a vertical section view through the liquid dispenser and a portion of the water conditioning system shown in FIG. 1.
FIG. 3 is a vertical section view of a second embodiment of our invention.

Referring now more particularly to the drawings wherein like numerals refer to like parts throughout the several views, FIG. 1 shows a very simple and inexpensive, yet dependable form of our invention generally at 10 in the cabinet 12 of a water conditioning system generally designated 11. In the particular form of water conditioning system shown, namely water softener 11, the cabinet 12 forms a brine tank 13. The brine tank 13 may have a conventional brine well as shown at 14. The mineral tank 15 is positioned in the brine tank 13 as shown in FIG. 1. A conventional control valve and timer mechanism 16 is mounted on the mineral tank 15 for providing the four operating cycles in the water softening system.

The cabinet 12 has an upper support plate 17 through which the top of the mineral tank 15 and the brine well 14 extend. The upper support plate 17 extends about two-thirds of the way across the top of the cabinet 12 and has a vertical baffle section 18. This leaves an opening 19 in the top of the cabinet 12 for loading the brine tank 13 with salt as is required from time to time.

The water softener cabinet 12 is provided with a lift-off cover (not shown) of suitable size and shape to accommodate the valve and timer mechanism 16 shown in FIG. 1.

As shown in FIG. 1, the container 20 of our controlled-feed liquid dispenser 10 may be positioned on the upper support plate 17 at one corner of the cabinet 12.

Referring now to FIG. 2, wherein one form of a liquid dispenser 10 embodying our invention is shown in section, the liquid container 20 thereof may be in the form of a plastic bottle or the like. The container 20 may have a removable vented cap such as 21. Dispenser 10 has a tube 22 of plastic or the like having inlet end 22a inserted into a conventional type filter stone 23 resting on the bottom of the container 20. The tube 22 extends upwardly out of the container 20 through a plug 24 and has a portion 22b thereof positioned above the level of the liquid 25 in the container 20. Tube 22 has an outlet end 22c which is inserted through a plug 26 in the cap 27 of the brine well 14. A wick 28 which may be made of cotton or other suitable fibers extends through the tube 22 as shown in FIG. 2. The intake end 28a of the wick 28 is preferably knotted to prevent the wick from pulling out of the tube 22.

Liquid dispenser 10 provides a continuous feed of liquid from container 20 to the brine well 14 of the brine tank 13 by wicking action. The rate of feed may be controlled within suitable limits by varying the size and/or the material of the wick.

During the regeneration cycle of the water softening system, the concentrated liquid cleaner, sanitizer or the like which has been fed into the brine well 14 of the brine tank 13 by the dispenser 10 is passed with the brine through the zeolite resin bed in the mineral tank 15 for cleaning and/or sanitizing the water softening system at the same time that the zeolite is regenerated.

FIG. 3 shows a modified form of dispenser 30 which provides more precise control of the liquid dispensed therefrom than the dispenser 10 shown in FIG. 2. Dispenser 30 comprises a container 31 which has a removable cap 32. The cap 32 may have an air vent as shown at 33 in FIG. 3 for maintaining the liquid 34 in the container 31 under substantially atmospheric pressure. A tube 35 has an inlet end 35a inserted into a conventional type filter stone 40 resting on the bottom of the container 31 and has a portion 35b located at an elevation above the level of the liquid 34 in container 31. The tube 35 has a reservoir portion 35c immediately above a solenoid valve 36 attached to the outlet end 35d of the tube 35. The solenoid valve 36 normally closes the reservoir outlet and has a discharge tube 37 inserted through the plug 26 in the cap 27 of the brine well 14 for discharging liquid into the brine tank of the water softening system. The solenoid valve 36 is adapted to be actuated by the timer mechanism 16 of the water softening system.

A wick 38 made of cotton or other suitable fiber extends from the intake end 35a of tube 35 through elevated portion 35b and downwardly to the reservoir portion 35c of the tube.

A small air tube 39 extends from the cap 32 of the container 31 into the tube 35 through the wall thereof. Tube 39 extends through the larger diameter tube 35 to a point adjacent the reservoir portion 35c of tube 35 for supplying air to the reservoir 35c to prevent siphoning of liquid from the container 31 after the solenoid valve is opened to empty the liquid from the reservoir.

Tube 39 also provides an escape for air which is displaced by liquid brought to the reservoir 35c by the wicking action. It is understood that the tube 35 may be vented to atmosphere merely by an opening in the wall thereof, however, because of the possibility of a buildup of deposits restricting or completely closing such an opening, venting tube 39 is preferred.

In operation dispenser 30 will accurately dispense a predetermined amount of the liquid 34 into the brine well 14 for introduction into the mineral tank 15 of the water softening system. The liquid from container 31 attracted by the intake end 38a of wick 38 is carried over to the reservoir portion 35c of the tube 35 by wicking action. The solenoid valve 36, which may be of conventional construction, is normally closed and the reservoir 35c will be filled with liquid until the level of the liquid reaches the end 38b of the wick 38 as shown in FIG. 3. At this point no more liquid will be transferred from the container 31 to the reservoir because the end 38b of the wick is immersed in the liquid in the reservoir.

The timer mechanism 16 of the water softening system 11 will open the solenoid valve 36 just prior to or during the regeneration cycle of operation for emptying the liquid from the reservoir 35c into the brine well 14 of the brine tank 13. This liquid will then be carried together with the brine into the mineral tank 15 for regenerating and cleaning the zeolite resin bed and otherwise sanitizing the water softening system 11.

The reservoir portion 35c of tube 35 must be kept under substantially atmospheric pressure when the solenoid valve 36 opens to prevent the liquid in the container 31 from being siphoned through tube 35 into the brine well 14. Air is thus taken in through the venting tube 39 and supplied to the reservoir portion 35c of the tube 35.

After the solenoid valve 36 is closed by the timer mechanism 16 of the water softening system 11, the reservoir 35c again begins to fill with the desired amount of liquid, which is determined by the elevation of the end 38b of wick 38, for the next regeneration cycle.

Both forms of our dispensers shown here for exemplification provide simple and inexpensive, yet dependable means for feeding a controlled amount of liquid cleaner, sanitizer, or the like into a water conditioning system.

It is understood that our invention is not confined to the particular construction and arrangement of parts herein illustrated and described, but embraces all such modified forms thereof as may come within the scope of the following claims.

We claim:
1. A liquid dispenser for a water conditioning system having a brine tank, a mineral tank and a timer mechanism for providing several operating cycles in said water conditioning system, including a regeneration cycle, said liquid dispenser comprising:
  (a) a container for holding liquid under substantially atmospheric pressure,
  (b) a tube having an inlet end opening into said container, an outlet end and a reservoir portion, said tube having a portion thereof above the level of the liquid in said container,
  (c) a wick disposed within said tube and extending from the liquid in said container to the reservoir portion of said tube,
  (d) a valve attached to the outlet end of said tube below said reservoir portion and being actuated by said timer mechanism for emptying the liquid in the reservoir portion of said tube into the brine tank of said water conditioning system for introduction into said mineral tank during said regeneration cycle, and
  (e) means venting said tube to atmosphere for preventing siphoning action in said tube.

2. The liquid dispenser as specified in claim 1 wherein said means comprises a second tube having a substantially smaller diameter than the first tube and having one end thereof open to atmosphere, said second tube extending through the wall of said first tube to the reservoir portion thereof.

3. The liquid dispenser as specified in claim 1 wherein the inlet end of said tube extends into the liquid in said container and including a filter stone attached to the inlet end of said tube for filtering the liquid attracted by said wick.

4. In a water conditioning system, the combination comprising:
  (a) a timer mechanism for providing several operating cycles in the water conditioning system including a regeneration cycle,
  (b) a mineral tank having a resin bed therein for conditioning water,
  (c) a brine tank for supplying brine to said mineral tank during said regeneration cycle,
  (d) a container for holding liquid under substantially atmospheric pressure,
  (e) a tube extending from said container to said brine tank and having a portion thereof above the level of the liquid in said container, and
  (f) a wick disposed within said tube and extending from the liquid in said container for feeding said liquid by wicking action from said container to said brine tank for introduction into said mineral tank with the brine during said regeneration cycle.

References Cited
UNITED STATES PATENTS

| | | | |
|---|---|---|---|
| 122,159 | 12/1871 | Crook | 222—187 |
| 897,131 | 8/1908 | Owen | 222—187 |
| 1,019,171 | 3/1912 | Melville-Hamilton | 222—464 X |
| 1,743,894 | 1/1930 | Johnson. | |
| 2,457,851 | 1/1949 | Taft | 222—187 |
| 2,495,230 | 1/1950 | Day et al. | 222—464 X |
| 2,520,056 | 8/1950 | Pozun | 222—187 X |

SAMUEL F. COLEMAN, *Primary Examiner.*